H. J. SEAMAN.
ADVERTISING NOVELTY.
APPLICATION FILED JAN. 11, 1916.

1,195,276.

Patented Aug. 22, 1916.

Witnesses

H. J. Seaman, Inventor by C. A. Snow & Co.
Attorneys

UNITED STATES PATENT OFFICE.

HERVEY JACOB SEAMAN, OF CHARLOTTESVILLE, VIRGINIA.

ADVERTISING NOVELTY.

1,195,276.        Specification of Letters Patent.        Patented Aug. 22, 1916.

Application filed January 11, 1916. Serial No. 71,535.

*To all whom it may concern:*

Be it known that I, HERVEY J. SEAMAN, a citizen of the United States, residing at Charlottesville, in the county of Albemarle and State of Virginia, have invented a new and useful Advertising Novelty, of which the following is a specification.

The present invention appertains to advertising novelties, and aims to provide an extremely cheap and simple advertising novelty which will provide an effective advertising medium.

The present invention resides in the provision of a tag or paster of novel form applied to a match, toothpick, pencil or other elongated article of general utility, and forming therewith an advertising medium resembling an arrow.

The tag or paster provides means for containing the advertising matter, while the body constitutes the article which is useful for its intended purpose. The matches, toothpicks or other articles having the tags applied thereto can be distributed gratuitously by merchants, manufacturers and the like, and the articles can thus be distributed in such a manner that the advertising received compensates for the cost of the devices, which in the first place will be extremely small due to the simplicity of the device and manner of producing the same. The tag can bear suitable advertising matter, whereby the article in being handled will accomplish the desired advertising effect, and the tag can also be used as a finger piece for sanitation and conveniently manipulating the match, toothpick or other article, thus giving the tag an additional function. The tag has the function of bearing the advertising matter, serving as the printed form of the medium, and also acting as a finger piece.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
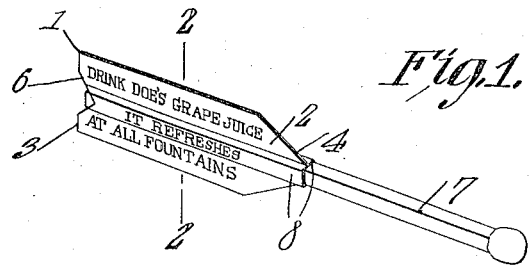
Figure 2:
Figure 3:
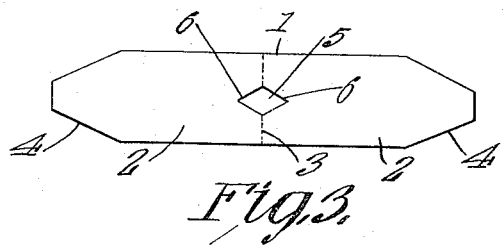

Figure 1 is a perspective view of one of the devices, using a match. Fig. 2 is a cross section taken on the line 2—2 of Fig. 1. Fig. 3 is a plan view of the blank tag or paster.

In carrying out the invention, there is provided an elongated tag or paster 1 of paper or other suitable material, which is shown in blank form in Fig. 3. The two halves 2 of the tag are divided by a transverse fold line 3, and the terminals of the tag 1 are preferably tapered or decreased in width, as at 4. The tag 1 is provided intermediate its ends and in the fold line 3 with an opening 5, preferably of diamond-shape, providing the notches 6 in the meeting or adjacent ends of the halves 2 to prevent puckering when the tag is folded. One side of the tag is provided with glue, paste or other adhesive, whereby when the tag is doubled on the fold line 3, the halves 2 of the tag can be pasted together, to provide a two-ply structure.

In applying the tag to the article, which as illustrated is a match 7, although it is to be understood that the tag can be used upon a toothpick, pencil, pen or other useful article, after the tag is folded partially on the fold line 3, the match or other article 7 is placed between the halves 2 of the tag, so that one terminal of the article 7 lies between the halves 2 midway between the edges thereof and upon the longitudinal median line of the tag. The halves of the tag are then pressed together, to adhere to one another, and to adhere to the article 7, the halves 2 being secured together at opposite sides of the article 7, and being bulged or offset outwardly, as at 8, to pass around and adhere to the article 7. The doubled tag in being secured to the article 7 thus provides oppositely projecting portions or wings for advertisements, while the article 7 provides the body of the device. The article 7 preferably extends to or partially into the notches 6, and the device thus provides an attractive advertising medium or novelty, the device being useful in that the tag not only acts as an advertising medium, but also provides a sanitary finger piece whereby the match 7 or other article can be conveniently handled.

Having thus described the invention, what is claimed as new is:

1. An advertising novelty embodying an elongated member, and an elongated doubled advertising tag having its fold line between its ends, the halves of said tag being pasted together and to one terminal of said member, the fold of said tag being adjacent to the end of said member, said member being disposed longitudinally between the edges of the tag and said tag providing a finger piece composed of opposite wings.

2. An advertising novelty embodying an elongated member, and a doubled tag pasted together and upon one terminal of said member, said tag having an opening at its fold line providing notches to prevent puckering, said tag providing a finger piece composed of opposite wings.

3. An advertising novelty embodying an elongated member, and an elongated doubled advertising tag having its fold line between its ends, the halves of said tag being pasted together and to one terminal of said member, said member being disposed between the edges of the tag, said tag having an opening at its fold line forming notches to prevent puckering, and said member extending to said notches.

In testimony that I claim the foregoing as my own, I have hereto affixed my signature in the presence of two witnesses.

HERVEY JACOB SEAMAN.

Witnesses:
H. A. DINWIDDIE,
WM. B. DOE.

Copies of this patent may be obtained for five cents each, by addressing the "Commissioner of Patents, Washington, D. C."